Feb. 17, 1959  E. R. EVANS  2,873,641
SCREW WITH CUTTER TO CHANGE FEMALE THREAD SHAPE
Original Filed June 9, 1949  2 Sheets-Sheet 1

Inventor
Edwin R. Evans
By
J. S. Murray
Attorney

Inventor
Edwin R. Evans

United States Patent Office 2,873,641
Patented Feb. 17, 1959

2,873,641

SCREW WITH CUTTER TO CHANGE FEMALE THREAD SHAPE

Edwin R. Evans, Detroit, Mich., assignor to Lock Thread Corporation, a corporation of Delaware Continuation of abandoned application Serial No. 98,139, June 9, 1949. This application April 5, 1954, Serial No. 420,849

2 Claims. (Cl. 85—47)

This invention relates to screws, and particularly relates to screw threads of a locking type. The subject matter of the invention is a continuation of my copending application filed June 9, 1949, under Serial Number 98,139, now abandoned. Reference is made also to applicant's co-pending application Serial Number 420,978, filed April 5, 1954, and directed to a method of forming male screw threads of the character herein disclosed.

An object of the invention is to provide a screw having a cutting edge at the leading end portion of its thread, adapted to cut sufficient metal from a female thread receiving such screw to afford a predetermined amount of interference between the two threads.

Another object is to provide the thread of a screw with a ramp-forming starting portion and to dispose said cutting edge in such relation to said starting portion as will largely predetermine the amount of cut taken by said edge.

Another object is to apply to a screw a thread of a modified Dardelet type distinguished by a wide root face, and to so provide a cutting edge on a starting portion of such thread that excess material will be cut from the crest of a female thread progressively receiving said screw, facilitating use of such a screw with female threads of a standardized American National type.

Another object is to form a screw with a socket coaxial with the thread of such screw, and to extend a passage to such socket from the starting portion of the thread for delivering to the socket material removed from a female thread by a cutting edge at the starting portion, as the screw is inserted in the female thread.

Another object is to shape said socket to operatively receive a tool serving to drive the screw.

Another object is to provide a screw having a thread distinguished by a wide root face and to impart to such face a shallow wave form throughout substantially its spiral extent, whereby a desired tight fit in a mating female thread may be had, with maximum use of elasticity of the thread-forming metal.

Another object is to impart such a polygonal contour to the socket of the blank by insertion of the punch that the root of the extruded thread will have numerous slight predetermined variations of diameter, imparting to such root a wave form, lending itself to a maximum use of elasticity of the metal forming a female thread when the screw is eventually tightly engaged with such a thread.

These and various other objects are attained by the construction hereinafter described and illustrated in the accompanying drawings, wherein.

Figure 2:
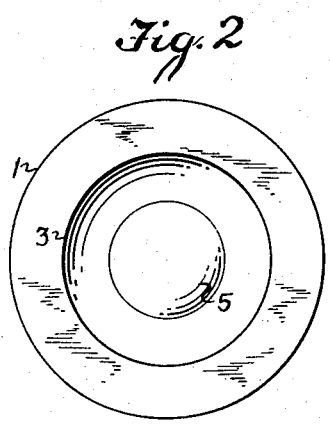
Fig. 2 is a rear end view of such blank.
Figure 1:
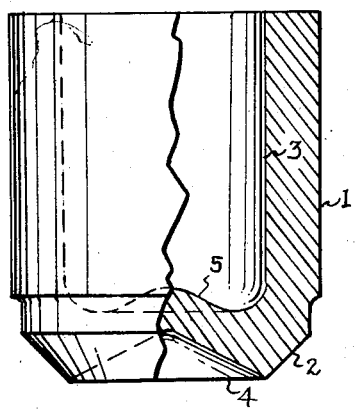
Fig. 1 is a side elevational view, in partial section, of a blank from which my improved screw may be extruded.

Referring now in greater detail to the drawings, Figs. 1 and 2 illustrate a substantially cylindrical metal blank 1 having a frusto-conical front end 2, the base angle of which is preferably 45 degrees. Extended centrally into said blank from its rear end is a socket 3, preferably substantially cylindrical and forming a wall at the front end of the blank. This wall is externally conically recessed at 4 and is internally centrally formed with a circular protuberance 5. Such a blank may be produced in various ways, as by stamping or extrusion. The exterior diameter of the blank is slightly less than the minor diameter of a thread required on the blank.

The first step in carrying out my improved method lies in formation of the blank 1, and the second step consists in inserting such blank at its front end in a die 6 (Fig. 3) having a chamber 7 preferably somewhat deeper than the blank for receiving the latter. Such chamber has its bottom coned as indicated at 8 to fit the recess 4 and its wall is formed with a thread 9, proportioned to serve as an extrusion matrix for accurately forming a desired thread on the blank.

The third step in my thread-forming method consists in forcing an oversized punch or hob 10 into the socket 3 to expand the blank and substantially conform it to the wall of the chamber 7, whereby the matrix established by the thread 9 is metal-filled to form from the blank a screw 1a with a thread 11. This thread, as illustrated, is of the American National Dardelet type, combining a 60 degree included angle between the thread blanks with a root face of a width far exceeding American National practice, such face having a few degrees of locking inclination to the thread axis, as is a Dardelet characteristic. Such a thread particularly lends itself to the described method, in being materially more shallow than an American National thread and hence requiring metal extrusion through a relatively less distance. The front end of the punch is sufficiently rounded at its periphery 12 to impose the required outward deflection on the socket wall. Excess of cross sectional area of the punch over that of said socket is of course accurately predetermined to displace a volume of metal substantially equaling capacity of the die matrix. It is preferred to displace a small volume of metal from the end face of the socket 3, additional to the peripheral displacement, and for this reason said end face is formed either with the aforementioned central protuberance 5 or the annular shoulder 13, shown in Fig. 3. Such protuberance or shoulder is substantially eliminated by the punch as its insertion is completed, affording sufficient metal flow in the front portion of the blank to completely fill the corresponding portion of the die matrix. It will be observed in this connection that the required thread on the blank has at least a portion of its leading convolution extending forwardly of the socket 3, thus entailing some forward as well as lateral flow of metal to fill the inner end portion of the matrix.

Figure 4:
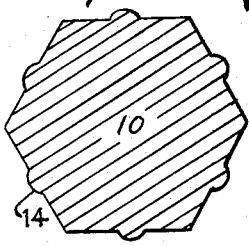
Fig. 4 is a cross sectional view of said punch, taken on the line 4—4 of Fig. 3.
Figure 3:
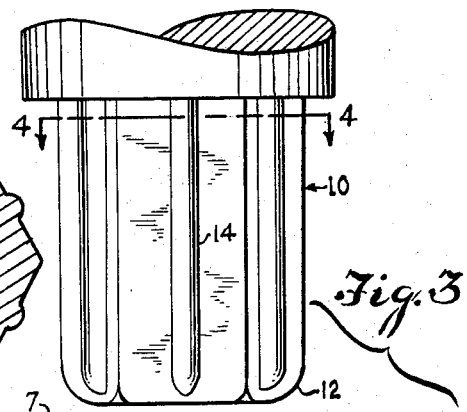
Fig. 3 is an axial sectional view of a blank slightly modified from Figs. 1 and 2, set into a thread-forming die, and showing a punch positioned for insertion in the blank to expand the latter.
Figure 7:
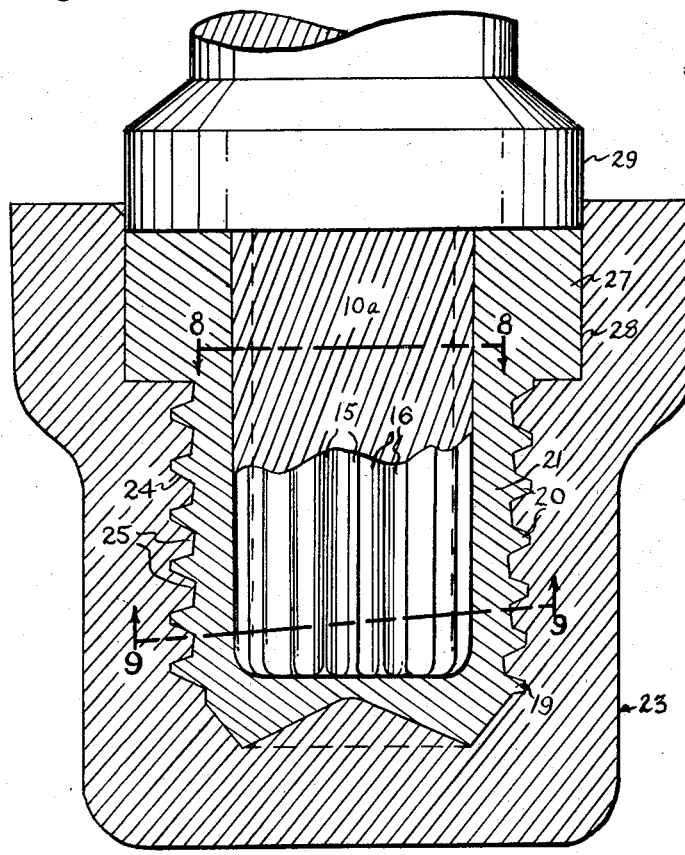
Fig. 7 is an axial sectional view of a type of blank suited to form a headed screw, showing such blank set into a suitable die and expanded by a modified type of punch to extrude the blank into a thread-forming matrix of the die.
Figure 8:
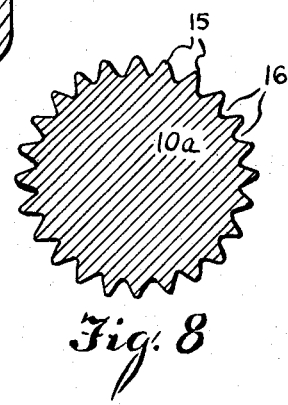
Fig. 8 is a cross sectional view of said modified punch, taken on the line 8—8 of Fig. 7.

The punch 10 might be cylindrical if it served no other purpose than to fill the die matrix. It has, however, the further function of reshaping the socket 3 and fitting it to a screw-driving tool, as for example, the well-known Allen wrench (not shown). Thus the punch may have the hexagonal cross section, best seen in Fig. 4, or any other desired polygonal form. It will be appreciated that a polygonal punch inserted in a smaller cylindrical socket must displace materially more metal at its apices than at its minimum radii, which bisect its lateral faces. The tendency, therefore, of the punch shown in Figs. 3 and 4 is to completely fill the die matrix at points outwardly opposed to the longitudinal edges of such punch and to leave slight vacancies at the root and crest of the extruded thread outwardly from the center portions of the lateral faces of the punch. It is not desired to eliminate the resultant slight variations of radius in the extruded thread, the variations at the thread root being useful, as will presently appear, but provision is made against excessively large variations. Thus in the aforementioned hexagonal punch, it is preferred to form each lateral face thereof with a rib 14, preferably semicylindrical, bisecting such face from end to end, the maximum radii of such rib as measured from the punch axis substantially equaling the radii of the punch apices. Provision of such ribs shortens the intervals between points of maximum radius in the crest and root of the extruded thread. It is apparent that various driving contours may be imparted to the socket 3 by forcing therein different oversized punches. Thus Figs. 7 and 8 show a punch 10a of generally cylindrical form but having its entire effective peripheral area formed with alternating ribs 15 and grooves 16 parallel to the punch axis. Such a punch adapts the resultant screw to be driven, if desired, by an ordinary screw driver inserted in diametrically opposed socket grooves 16a (Fig. 9) resulting from such punch. The punch 10 results in very numerous but quite slight variations in crest and root radius of the extruded thread.

Figure 9:
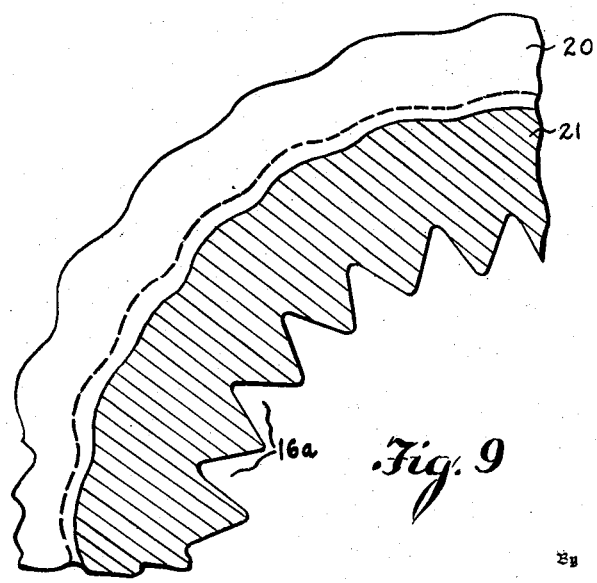
Fig. 9 is an enlarged fragmentary cross sectional view taken on the line 9—9 of Fig. 7 and showing a wave form imparted to a thread by the extrusion apparatus of Fig. 7.
Figure 10:
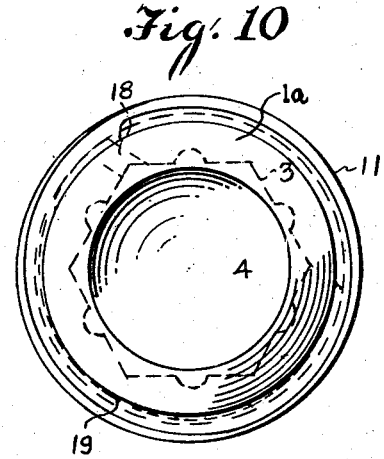
Fig. 10 is a view of the closed end of the screw shown in Fig. 5.

Fig. 9 illustrates in highly magnified form, the wavy root face resulting from varying the amount of metal extrusion at regular intervals along the spiral length of the thread. The advantage derived from this wave form pertains to interference. For many purposes an interfering engagement of male and female threads is desirable to assure ample resistance to heavy vibration and stresses. In establishing such an engagement if a maximum advantage is taken of such elasticity as is possessed by the interfering materials, mutilation of the threads is minimized and the feasible number of separations and repeated engagements is increased. The wave form exemplified in Fig. 9 is suited to produce an extensive series of alternating high and relatively low stress root regions when the illustrated screw has interfering engagement with a female thread. Such alternate regions lend themselves strongly to utilizing the slight elasticity of metal, affording its expansion with slight molecular travel into the low stress regions from intervening regions of high stress.

It is evident that removal of a screw formed by the above-described method entails a relative rotation of the screw and die, and that the punch may serve as a means for imparting such a rotation to the screw. It is to be understood, therefore, that the punch is suited to rotation, as well as reciprocation.

Figure 5:
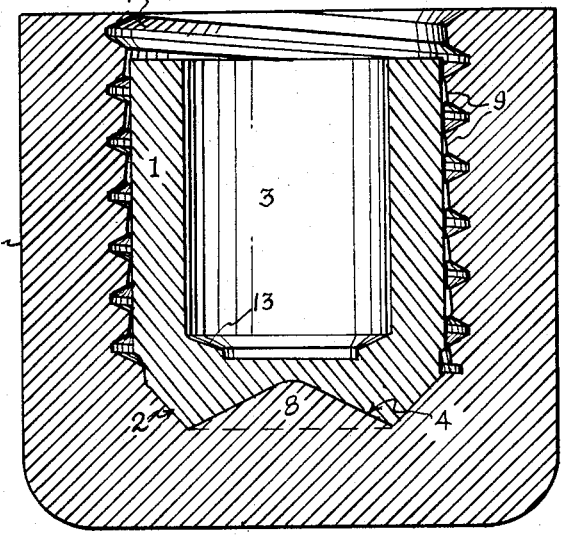
Fig. 5 is a side elevational view of a set screw formed from said blank by the apparatus of Fig. 3, showing a passage drilled in the screw subsequent to the extrusion operation.
Figure 5:
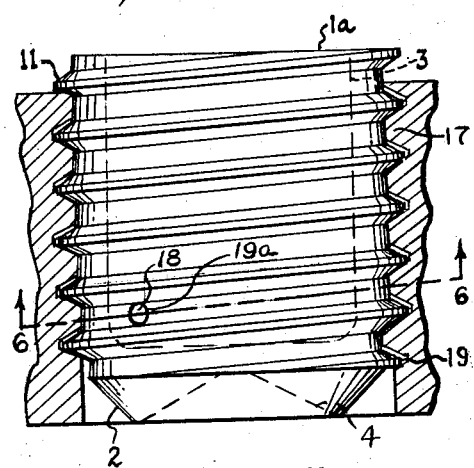
Figure 6:
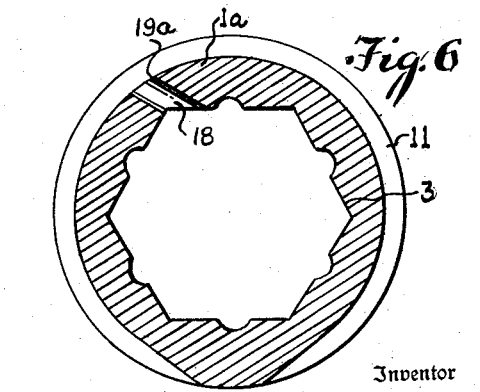
Fig. 6 is a cross-sectional view of said screw, taken on the line 6—6 of Fig. 5.

The screw produced by the method so far described will for many purposes be complete. If, however, it is desired to set up an accurately predetermined interference between such screw and a female thread 17, the passage 18 shown in Figs. 5 and 6 will be drilled. Such passage extends from a starting convolution or fractional convolution 19 of the screw and opens into the forward or inner end of the socket 3. Said passage is illustrated as parallel to a screw diameter from which said passage is materially spaced, so that it intersects the screw thread at a sufficiently acute angle (Fig. 6) to form a cutting edge 19a, effective during insertion of the screw in a female thread. The starting portion 19 of the screw thread is progressively reduced in diameter from its juncture with the normal thread to its entering end, and the cutting radius of the edge 19a may thus be predetermined by selecting a desired point for said opening along the spiral length of the starting thread. Chips removed from the female thread by the edge 19a are delivered through the passage 18 to the socket 3, wherein they may be retained by a little oil or grease. In the case of a thread characterized by a wide root face, as shown, it is preferred to let the passage 18 open completely or at least primarily in such face, so that the edge 19a will take effect on the crest of a mating female thread. This particularly suits a screw bearing an American National Dardelet thread to mesh with an ordinary American National female thread, removing from the latter such excess crest material as necessary for a desired fit.

Fig. 7 illustrates an alternative form of my extrusion apparatus, suited to extrude a thread 20 upon a hollow blank 21 and showing such thread extruded. As in the first-described method, the blank is set into a die 23 having a chamber 24, accommodating the blank without material lost motion. The peripheral wall of the die is formed, as in the first-described method, with a matrix thread 25 receiving metal extruded from the blank and thus forming the thread 20. The oversized punch 10a is forced into the blank for extrusion purposes, the punch illustrated being that heretofore mentioned having alternating ribs 15 and grooves 16 to impart a driving contour to the socket of the blank. Departing from previous description, the blank is formed with a head 27 suited to limit insertion, in use, of the screw resulting from the described method. The die is countersunk at 28 to accommodate the head 27, and a collar 29 on the punch may impart any desired top face to said head.

Formation of screws by the described method derives numerous advantages. Such waste as is entailed by screw machine or other thread cutting methods is avoided. Time and labor are saved, and likewise some material in giving the screw a hollow or socket form and in imparting a driving contour to the blank by the same operation that extrudes the thread. It will be appreciated that the method described is particularly suited to the production of set screws since for almost every purpose such screws either are or may be of a headless type. The described method is believed the only one so far conceived that lends itself to production of such a wave form of root as Fig. 9 exemplifies, with resultant major use of elasticity of the metal in obtaining interfering fits.

The root face of the starting or ramp-forming convolution or partial convolution 19 is preferably parallel to the axis of the thread, as shown, merging gradually into the normal root face which has a locking inclination to said axis.

The wave form illustrated in Fig. 9, while useful at the root of the extruded thread, is not necessarily a feature of such thread, since the latter, as has been stated, may be formed by a cylindrical punch, in producing such screws as do not require a socket of screw-driving contour.

It will be appreciated that in forming a headed screw by my method, as per Fig. 7, the head may be given any desired thickness and peripheral form, and that either the head or die may be chambered to impart such peripheral form.

What I claim is:

1. A screw having a male thread and leading and trailing ends and a socket opening in its trailing end, said thread having a root face of a width at least approximately equal to the base width of the thread, and having a passage extending, in proximity to the leading end of the screw, from the root face to the socket, a cutting edge being formed at the intersection of said face and passage by the rotatively trailing portion of such intersection, and being substantially confined to said face, for removing material from the crest of a female thread engaged by the male thread, and said passage delivering such material to the socket.

2. A screw having a male thread and leading and trailing ends and a socket opening in at least one of said ends, said thread having a root face of a width at least approximately equal to the base width of the thread, and having a passage extending, in proximity to the leading end of the screw, from the root face to the socket, a cutting edge being formed at the intersection of said face and passage by the rotatively trailing portion of such intersection, and being substantially confined to said face, for removing material from the crest of a female thread engaged by the male thread, and said passage delivering such material to the socket.

References Cited in the file of this patent

UNITED STATES PATENTS

| | | |
|---|---|---|
| 463,444 | Densmore | Nov. 17, 1891 |
| 586,419 | Collet | July 13, 1897 |
| 1,075,710 | Goodwin | Oct. 14, 1913 |
| 1,243,818 | Cummins | Oct. 23, 1917 |
| 1,330,673 | Anderson | Feb. 10, 1920 |
| 2,036,551 | Stevens | Apr. 7, 1936 |
| 2,135,637 | Gade | Nov. 8, 1938 |
| 2,177,100 | Frame | Oct. 24, 1939 |
| 2,191,944 | Shaw | Feb. 27, 1940 |
| 2,269,476 | Poupitch | Jan. 13, 1942 |
| 2,385,991 | Huntoon | Oct. 2, 1945 |
| 2,387,720 | Davis | Oct. 30, 1945 |
| 2,402,159 | Hatton | June 18, 1946 |
| 2,437,638 | Evans | Mar. 9, 1948 |
| 2,484,644 | Poupitch | Oct. 11, 1949 |
| 2,631,812 | Mueller et al. | Mar. 17, 1953 |
| 2,637,361 | Nagel | May 5, 1953 |

UNITED STATES PATENT OFFICE
CERTIFICATE OF CORRECTION

Patent No. 2,873,641                                                  February 17, 1959

Edwin R. Evans

It is hereby certified that error appears in the printed specification of the above numbered patent requiring correction and that the said Letters Patent should read as corrected below.

Column 2, line 47, for "blanks" read -- flanks --.

Signed and sealed this 14th day of July 1959.

(SEAL)
Attest:

KARL H. AXLINE                                                   ROBERT C. WATSON
Attesting Officer                                           Commissioner of Patents